(12) United States Patent
Ree et al.

(10) Patent No.: US 8,670,416 B2
(45) Date of Patent: Mar. 11, 2014

(54) SEGMENT SIZE DETERMINATION

(75) Inventors: Bradley Richard Ree, Cumming, GA (US); Ryan Marc LaFrance, Marietta, GA (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 13/367,221

(22) Filed: Feb. 6, 2012

(65) Prior Publication Data

US 2013/0201839 A1 Aug. 8, 2013

(51) Int. Cl.
*H04W 4/00* (2009.01)
(52) U.S. Cl.
USPC .......................................... 370/333; 370/470
(58) Field of Classification Search
USPC ......... 370/252, 254, 255, 332, 333, 470, 472; 709/221, 232
See application file for complete search history.

(56) References Cited

U.S. PATENT DOCUMENTS

| | | | | |
|---|---|---|---|---|
| 6,061,410 A * | 5/2000 | Linz | ............................ | 375/371 |
| 6,937,573 B2 * | 8/2005 | Chan et al. | ..................... | 370/252 |
| 7,826,521 B1 * | 11/2010 | Sun et al. | ........................ | 375/225 |
| 2002/0080774 A1 * | 6/2002 | Griffith et al. | ................. | 370/352 |
| 2006/0164987 A1 * | 7/2006 | Ruiz Floriach et al. | ....... | 370/235 |
| 2010/0091677 A1 * | 4/2010 | Griff et al. | ...................... | 370/252 |
| 2010/0202298 A1 * | 8/2010 | Agarwal et al. | ............... | 370/252 |
| 2011/0222415 A1 * | 9/2011 | Ramamurthi et al. | ........ | 370/252 |
| 2011/0271110 A1 * | 11/2011 | Ohba et al. | ..................... | 713/168 |
| 2012/0099457 A1 * | 4/2012 | Roy | ............................... | 370/252 |

* cited by examiner

*Primary Examiner* — Paul H Masur
*Assistant Examiner* — Michael Phillips
(74) *Attorney, Agent, or Firm* — Fletcher Yoder, P.C.

(57) ABSTRACT

A method is provided that includes determining, via data processing circuitry, error rate metrics of data transmissions over a constrained application protocol (CoAP) using a first CoAP segment size. The method further includes determining, via the data processing circuitry, a second CoAP segment size for the data transmissions based at least in part upon the error rate metrics.

17 Claims, 3 Drawing Sheets

SEGMENT SIZE DETERMINATION

BACKGROUND OF THE INVENTION

The subject matter disclosed herein relates to routing data through a network. In particular, the disclosed subject matter relates to determining segmentation sizes of data that is routed through a network.

A variety of systems, such as smart energy meters on a smart grid, transmit and receive data to and/or from other systems, such as a utility company head-end server. Typically, the data is segmented and transmitted via packets/fragments, such that only a portion of the data is transferred at a given time. Packet-based communications may provide enhanced routing of data and increased error-detection abilities as compared to non-packet-based communications. Unfortunately, typical packet-based communications approaches may use static segmentation sizes, which may result in segmentation that causes unnecessary traffic on the network. For example, such static segmentation implementations may result in unnecessary retransmission of one or more valid data fragments, due to data corruption in one or more of the other data fragments in a large data segment. Further, when small data segments are used, an increase in acknowledgement signals may occur. The retransmission of packets/fragments and/or an increase in acknowledgement signals may be costly and inconvenient due to an increased utilization of bandwidth and/or time necessary to transmit the data.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a method includes determining, via data processing circuitry, error rate metrics of data transmissions over a constrained application protocol (CoAP) using a first CoAP segment size; and determining, via the data processing circuitry, a second CoAP segment size for the data transmissions based at least in part upon the error rate metrics.

In a second embodiment, a smart meter is configured to measure energy consumption. The smart meter is further configured to communicate data relating to the energy consumption over a constrained application protocol (CoAP). The CoAP is configured to divide the data into CoAP segments of a CoAP segment size. The smart meter is configured to determine error rate metrics of communications over the CoAP, determine a CoAP segment size modification based upon the error rate metrics, and modify the CoAP segment size based upon the CoAP segment size modification.

In a third embodiment, an article of manufacture includes one or more tangible, machine-readable media configured to store processor-executable instructions. The instructions include instructions to determine error rate metrics of communications over the CoAP, instructions to determine a CoAP segment size modification based upon the error rate metrics, and instructions to modify the CoAP segment size based upon the CoAP segment size modification.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, while the current discussion uses energy meters as an example, the features and techniques described herein may be useful for a multitude of meters such as any utility meter (e.g., gas, water, electricity, etc.).

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain communication networks, such as a smart grid network, may include multiple nodes intermeshed or communicatively coupled to other nodes. For example, a network node may include a smart meter communicatively connect to one or more neighborhood/nearby meters. Such intercommunication between nodes is referred to as a mesh network. Mesh networks enable enhanced communication reliability due to the multiple paths that may be present between nodes. Should one path fail, a second path may be used to communicate with the node.

The communication of data on such communication networks may utilize packet-based communications. The data is segmented and each segment is sent as a grouping of packets to their destination. The embodiments described herein include systems and methods useful for enabling dynamic selection of a segmentation size of data transmitted on a wired and/or wireless mesh network. Through utilization of various error rate statistics, the segmentation size may be increased or reduced such that network efficiency may be increased. For example, when the error rate statistics are above a maximum error rate threshold, the segment size may be reduced. When the error rate statistics are below a minimum error rate threshold, the segment size may be increased.

Figure 1:
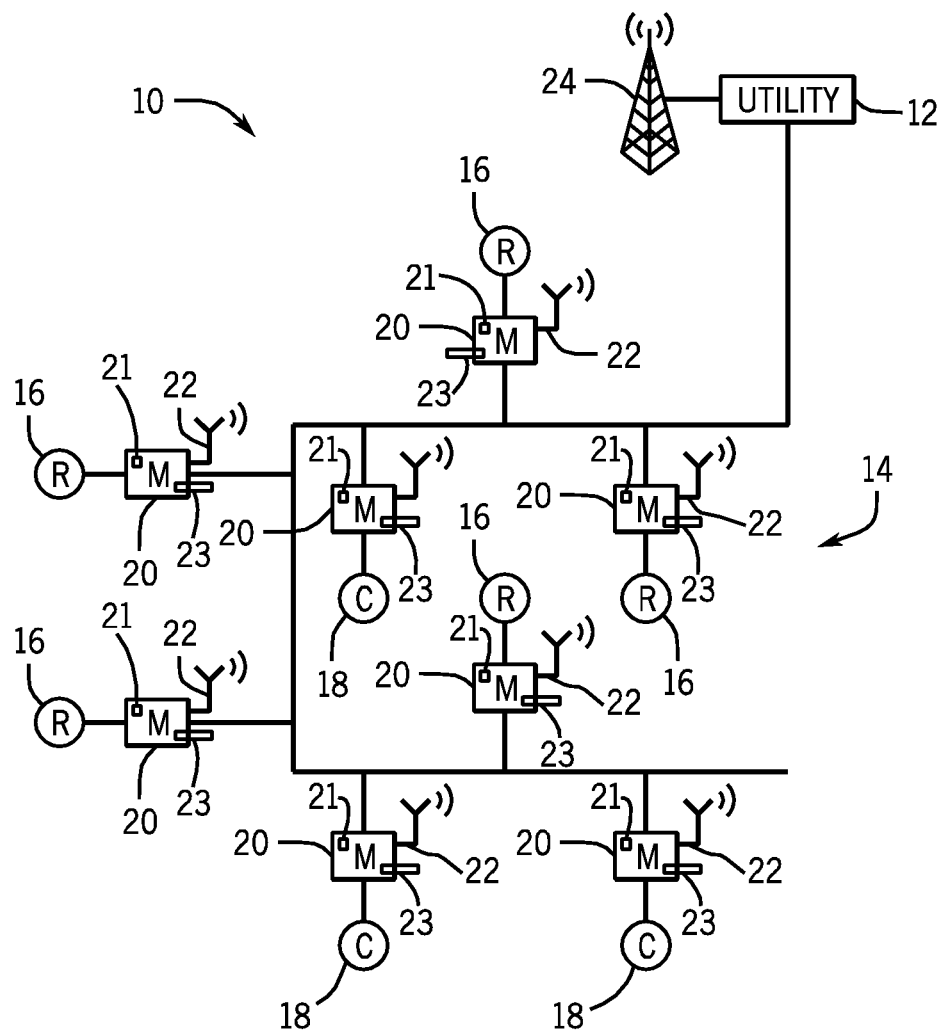
FIG. 1 is a block diagram of an embodiment of a mesh network system utilizing a constrained application protocol (CoAP) where the data transmitted through the wireless mesh network system is segmented based upon transmission error rates.

With the foregoing in mind, FIG. 1 is a block diagram of an embodiment of a mesh network system 10 utilizing a constrained application protocol (CoAP) where the data transmitted through the wireless mesh network system is segmented based upon transmission error rates. It is important to note that while the current discussion makes reference to smart meters on a mesh network, such discussion is not intended to limit the current disclosure to energy meter implementations, but instead, is merely provided as an example implementation.

In the current embodiment, a power utility 12 may supply power to a power grid 14. Loads on the power grid 14 may include, for example, residential establishments 16 and commercial establishments 18. The power consumption of the residential establishments 16 or commercial establishments18 may be monitored by energy meters 20. Additionally, the energy meters 20 may communicate with the power utility 12 (e.g., a head-end server of the power utility 12) via data communication radios 22. As will be discussed in more detail below, the data provided between the power utility 12 and the energy meters 20 may be segmented such that traffic on the communications network may be reduced.

In some embodiments, energy meters 20 and/or the power utility 12 utilize the constrained application protocol (CoAP) to support meter reading and control of the energy meter and the data communication radios 22. CoAP is based on a User Datagram Protocol (UDP) that runs over an IPv6, Low power Wireless Personal Area Network (6LoWPAN). UDP is a transmission protocol without an implicit handshaking requirement, thus simplifying communication. 6LoWPAN extends IPv6 for low-powered communications, such as low-power radio communications (e.g., via communications radios 22 of FIG. 1). In some embodiments, the energy meters 20 may include a storage or memory 21 (e.g., a meter 20 firmware storage) and/or data processing circuitry 23 (e.g., an integrated board or an add-on board plugged into an expansion slot of the meter 20) that enable the meters 20 to communicate over the CoAP using a dynamic segmentation size based upon detected data communication transmission errors.

Figure 2:
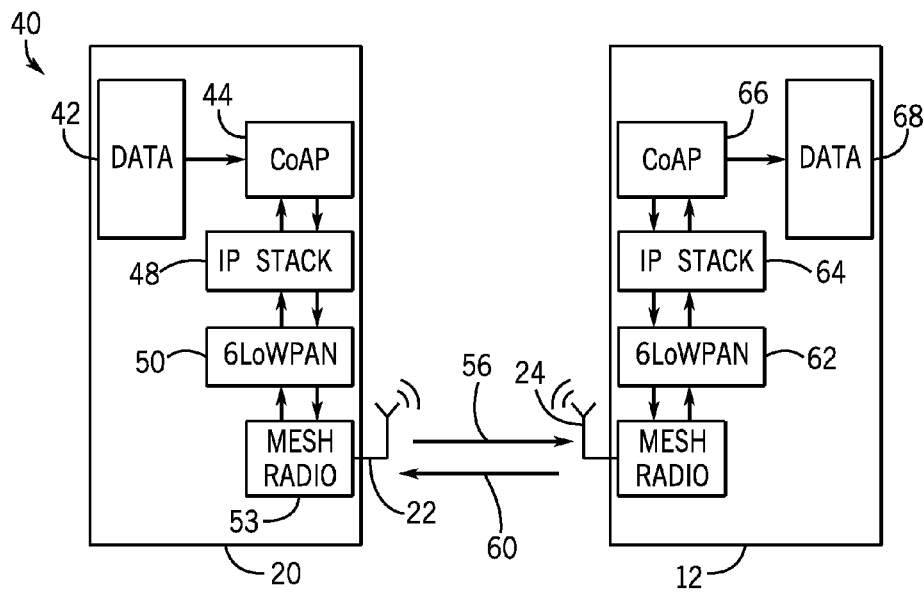
FIG. 2 illustrates a layered network architecture model for routing data using CoAP and IPv6 over Low power Wireless Personal Area Networks (6LoWPAN), in accordance with an embodiment.
Figure 3:
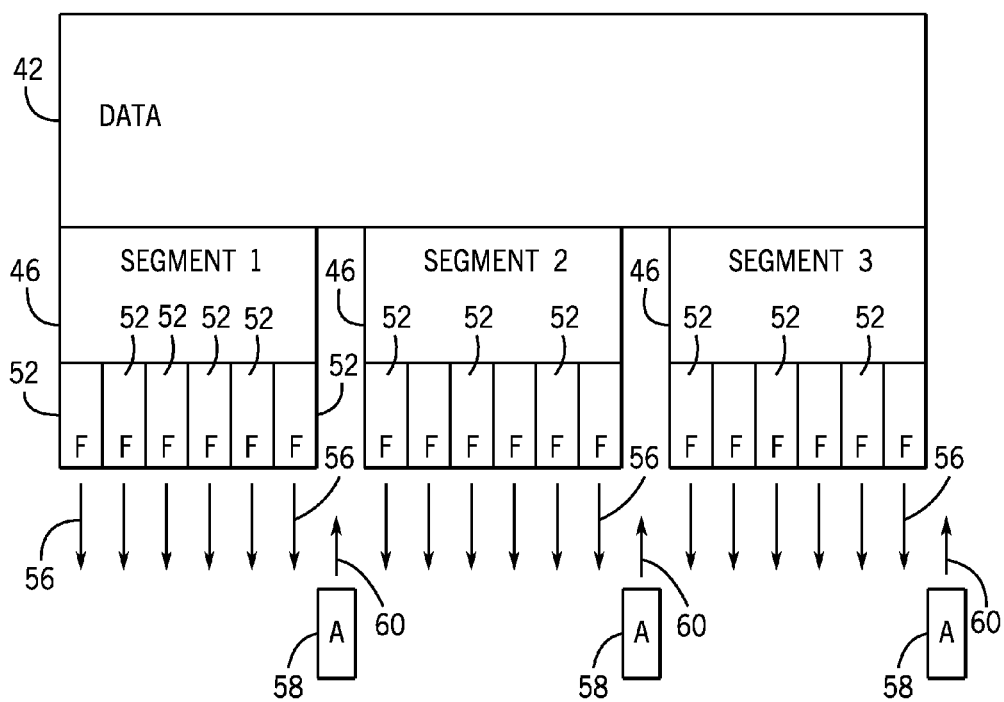
FIG. 3 illustrates an embodiment of data communications using the layered network architecture of FIG. 2, in accordance with an embodiment.

For clarity, FIGS. 2 and 3 will be discussed together. FIG. 2 provides an illustration of a layered network architecture model 40 for routing data using CoAP and IPv6 over Low power Wireless Personal Area Networks (6LoWPAN), in accordance with an embodiment. FIG. 3 illustrates an embodiment of data communications using the layered network architecture model 40, in accordance with an embodiment.

In the current embodiment, data 42 to be transmitted (e.g., metrology data representative of energy consumption) is generated by an energy meter 20. Alternatively, the data 42 to be transmitted may be control commands generated by the power utility 12 to be transmitted to the energy meter 20. The CoAP application 44 receives and segments the data 42 into data segments 46. In some embodiments, the CoAP application will provide a maximum segment size of 1280 bytes (note that in alternative embodiments the maximum segment size could vary, e.g., 2560 bytes, 640 bytes, etc.). The first data segment 46 (e.g., SEGMENT 1) is provided by the CoAP application 44 to the IP stack 48. The IP stack 48 routes the first data segment 46 to the 6LoWPAN layer 50, where the data segment 42 is divided into smaller fragments 52. The size of the fragments may be determined by the 6LoWPAN layer 50 based upon a maximum transmission unit (MTU) for the radio 53. For example, in some embodiments the radio 53 may have an MTU of 127 bytes (note that in other embodiments the MTU may vary), and thus, the fragments 52 will be 127 bytes. It is important to note that, in some embodiments, only a portion of each fragment 52 may be used to store a piece of the segment 46 (and ultimately data 42). A portion of each fragment 52 may be used to store Internet Protocol (IP) overhead and/or 6LoWPAN header information.

For each segment 46, the data fragments 52 may be transmitted 56 from the sending system (e.g., energy meter 20) to the receiving system (e.g., head-end server at a power utility 12). The receiving system (e.g., utility 12) receives the data fragments 52 via the radio 24. The data fragments 52 are passed through the 6LoWPAN layer 62 and the IP stack 64, where they are reassembled into a data segment 46. The data segments 46 are passed to the CoAP application 66, where they are reassembled into transmitted data 68.

Upon receiving all of the fragments 52 for a given segment 46 (e.g., SEGMENT 1), an acknowledgement signal 58 may be transmitted 60 from the receiving system. However, if a single fragment is corrupted and/or does not reach the receiving system, each of the fragments 52 for the given segment may need to be retransmitted before the acknowledgement signal 58 will be transmitted. Thus, when such errors occur, retransmission of the fragments 52 may result in increased network traffic. When the segment 46 size is large, with an increased number of data fragments 52, there is more potential that at least one of the fragments for the given segment 46 will be corrupt and/or not reach the receiving system, causing each of the other fragments 52 to be retransmitted, thus causing increased network traffic. Further, network traffic may also increase if the segment 46 sizes are too small. When the segment 46 size is small, the number of acknowledgement signal 54 transmitted 60 through the network will increase. For example, if the segment 46 size held two data fragments 52, an acknowledgement signal 58 would be transmitted 60 for every two data fragments 52. Thus, the network traffic would be greatly increased through an increased number of acknowledgement signals 58 transmitted through the network.

To remediate unnecessary traffic caused by segment 46 sizes that are large or small, the current embodiments may determine error rate metrics of the data transmissions. The error rate metrics may be used to determine whether the segment 46 sizes should be increased, decreased, or unchanged. For example, the error rate metrics may include a current error rate for the current segment size that is being used, a historical error rate, and/or a predicted error rate. A new segment size may be determined based upon the available error rate metrics. Generally, as the error rate increases, the disclosed embodiments may decrease the size of the segment 46, such that less potential for retransmission will occur. Further, when there is a relatively low error rate, the disclosed embodiments may increase the size of the segment 46, such that increased traffic from a small segment 46 size (e.g., excessive transmission 60 of acknowledgment signals 58) may be reduced. Whether increasing or decreasing the segment sizes, such size modifications may transition granularly such that an appropriate segment size may be fine-tuned (e.g., the sizes may be modified in small increments such that an appropriate segment size may be more accurately identified).

Figure 4:
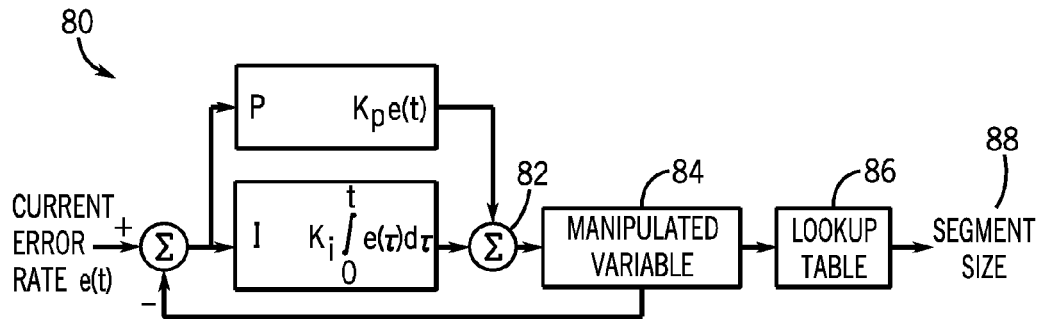
FIG. 4 illustrates an embodiment of a method for determining a segment size for data transmission based upon the current error rate and an average error rate over time.
Figure 5:
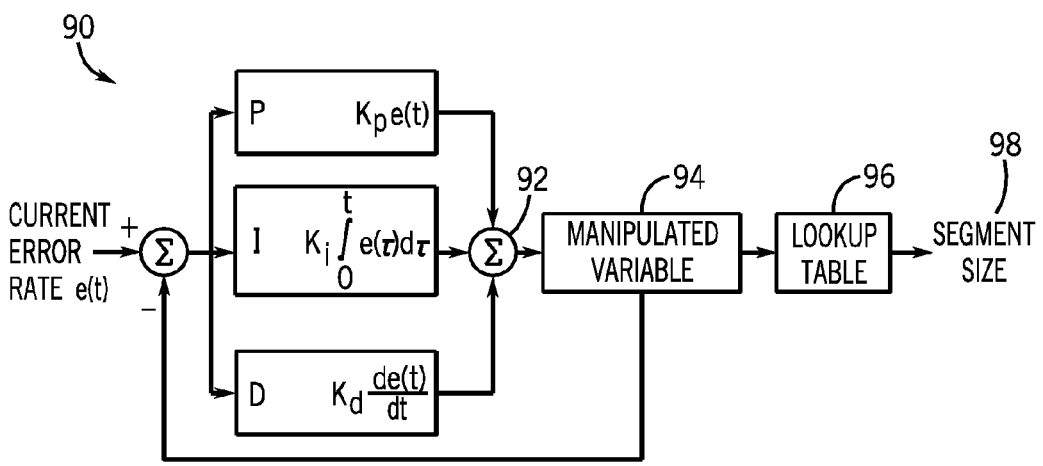
FIG. 5 illustrates an embodiment of a method for determining a segment size for data transmission based upon the current error rate, an average error rate over time, and a correction factor for a predicted future error rate.
Figure 6:
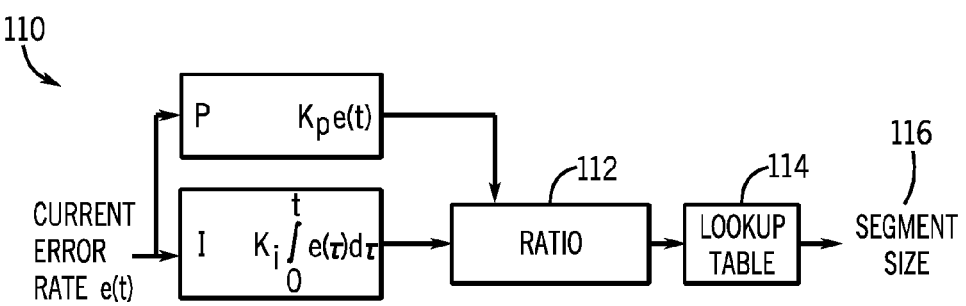
FIG. 6 illustrates an embodiment of a method for determining a segment size for data transmission based upon the current error rate and an average error rate over time.

FIGS. 4-6 illustrate embodiments of algorithms for determining a modified segment size, taking into account error rate statistics. The algorithms may be computer implemented instructions stored in a non-transitory, tangible, computer-readable medium (e.g., a memory or storage). Using data processing circuitry (e.g., a proportional-integral-derivative (PID) controller), a modified segment 46 size may be determined, based upon error rate statistics. Values from the PID controller may be plugged into one or more lookup tables such that an appropriate segment 46 size may be determined based upon the error rate statistics. Once the new segment 46 size is determined, the data processing circuitry may modify the segment 46 size to the new segment 46 size value found in the one or more lookup tables.

A PID controller may include three separate constant parameters: the proportional, the integral, and the derivative values (P, I, and D, respectively). P provides a current or instantaneous error rate, I provides a historical error rate, and D provides a predicted or expected error rate in the future. In certain embodiments, only one or two of the PID parameters may be utilized to provide a new segment 46 size based upon data communication error rates.

P is derived using the formula:

$$K_p e(t) \qquad (1)$$

$K_p$ is a proportional gain or constant and e(t) is the current or instantaneous error rate.

I is derived using the formula:

$$K_i \int_0^\tau e(\tau) d\tau \qquad (2)$$

$K^i$ is a weighting constant or the integral gain constant and the integral is the sum of the instantaneous error over time that gives the accumulated offset that should have been corrected previously.

D is derived using the formula:

$$K_d \frac{d}{dt} e(t) \qquad (3)$$

$K_d$ is the derivative gain, $$\frac{d}{dt} e(t)$$

is derivative of the current error rate.

FIG. 4 illustrates an embodiment of an algorithm 80 for determining a segment 46 size for data transmission based upon the current error rate e(t) and an average error rate over a certain period of time (t) $\int_0^t e(\tau) d\tau$. Using data processing circuitry, the current weighted error rate P is added 82 to the weighted average I. The sum of these two numbers (the manipulated variable 84) is fed into a lookup table 86 that provides a corresponding segment 46 size 88. Then, the data processing circuitry may modify the original segment 46 size to the newly determined segment 46 size 88. The algorithm 80 may be continuously repeated, to continually provide new segment 46 sizes 88 based upon the error rate statistics. The manipulated variable 84 is subtracted from each subsequent current error rate input e(t) such that previous manipulated variable 84 is not considered in subsequent iterations of the algorithm 80.

FIG. 5 illustrates an embodiment of an algorithm 90 for determining a segment size for data transmission based upon the current error rate e(t) and an average error rate over time $\int_0^t e(\tau) d\tau$, similar to FIG. 4. Additionally, in the embodiment of FIG. 5, the segment 46 size is determined based upon a correction factor for a predicted future error rate $$\frac{d}{dt} e(t).$$

For example, the weighted derivative of the current error rate, D, is added 92 into the current weighted error rate P and the weighted average I to provide a correction factor for what the error rate may be in the future. This new manipulated variable 94 may be fed into a lookup table 96 that determines the appropriate segment 46 size. Then, the data processing circuitry may modify the original segment 46 size to the newly determined segment 46 size 98. Similar to algorithm 80 of FIG. 4, algorithm 90 may be continuously repeated, to continually provide new segment 46 sizes 98 based upon the error rate statistics. The manipulated variable 94 is subtracted from each subsequent current error rate input e(t) such that previous manipulated variable 94 is not considered in subsequent iterations of the algorithm 90.

FIG. 6 illustrates an embodiment of an algorithm 110 for determining a segment 46 size for data transmission based upon the current error rate e(t) and an average error rate over time $\int_0^t e(\tau) d\tau$. As discussed above, the average error rate may be taken over a period of time (e.g., 1 minute, 1 hour, 1 day, or 1 month). The weighted average error rate I is compared to the weighted current error rate P. The ratio 112 of these two numbers is fed into a lookup table 114 to determine the optimal segment 46 size 116. If the ratio is positive and over a certain percentage for a certain period of time, the segment 46 size may decrease in increments of the MTU and data fragments 52 (e.g., 127 bytes) down to a minimum of the MTU and 1 data fragment 52 (e.g., 127 bytes). If the ratio is negative and over a certain percentage for a certain period of time, the segment 46 size may be increased. In some embodiments, the segment 46 size may be increased in increments of the MTU and/or the data fragment 52 size (e.g., 127 bytes). The segment size may increase up to the maximum segment size of the CoAP application (e.g., 1280 bytes).

Technical effects of the invention include a data communications protocol that is enabled to provide dynamically adjustable segmentation of data based upon the error rate experienced while communicating data on a network. The dynamically adjustable segmentation may increase efficiency by limiting the amount of retransmitted data fragments when one or more data fragments are corrupt. Further, larger segmentation may result in less traffic due to acknowledgement signals provided by the receiving system. Thus, by dynamically selecting a segmentation size based upon the transmission error rate, the segmentation may be properly tuned, such that network congestion may be reduced.

Using the error rate statistics (e.g., the instantaneous error rate, the historical error rate, and/or the predicted or future error rate), a more appropriate segmentation of the data to be transmitted may be determined. High error rates tend to occur when the segmentation size is large. Thus, in such scenarios, the segmentation size may be reduced. Further, when relatively few errors are detected, the system may not be transmitting at its highest low-error rate efficiency (e.g., maximum segmentation size that produces few errors). Thus, in such scenarios, the segmentation size may be increased. The segmentation size determination may continue during the entire duration that data is being transmitted. Thus, the system may adapt to changes in the network and/or previous modifications to the segmentation size.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   determining, via data processing circuitry, error rate metrics of data transmissions over a constrained application protocol (CoAP) using a first CoAP segment size;
   determining, via the data processing circuitry, a second CoAP segment size for the data transmissions based at least in part upon the error rate metrics;
   wherein determining the error rate metrics comprises determining a current error rate of the data transmissions and determining a historical average of error rates of the data transmissions and wherein determining the second CoAP segment size comprises:
   weighting the current error rate to obtain a weighted current error rate;
   weighting the historical average of error rates to obtain a weighted average;
   summing the weighted current error rate and the weighted historical average to obtain a manipulated variable; and
   correlating the manipulated variable with a corresponding CoAP segment size to obtain the second CoAP segment size.

2. The method of claim 1, comprising modifying the data transmissions to use the second CoAP segment size.

3. The method of claim 1, wherein determining the second CoAP segment size comprises reducing the first CoAP segment size when the current error rate is above a maximum error rate threshold.

4. The method of claim 1, wherein determining the second CoAP segment size comprises increasing the first CoAP segment size when the current error rate is below a minimum error rate threshold.

5. The method of claim 1 comprising continually determining the second CoAP segment size by:
   subtracting the manipulated variable from the current error rate;
   summing the weighted current error rate and the weighted average to obtain the manipulated variable; and
   correlating the manipulated variable with the corresponding CoAP segment size to obtain a new second CoAP segment size.

6. The method of claim 1, wherein determining the error rate metrics comprises determining a derivative of the current error rate, and wherein determining the second CoAP segment size comprises adding the derivative of the current error rate to the manipulated variable prior to correlating the manipulated variable with the corresponding CoAP segment size.

7. A method, comprising:
   determining, via data processing circuitry, error rate metrics of data transmissions over a constrained application protocol (CoAP) using a first CoAP segment size;
   determining, via the data processing circuitry, a second CoAP segment size for the data transmissions based at least in part upon the error rate metrics;
   wherein determining the error rate metrics comprises determining a current error rate of the data transmissions and determining a historical average of error rates, and wherein determining the second CoAP segment size comprises:
   weighting the current error rate to obtain a weighted current error rate;
   weighting the historical average of error rates to obtain a weighted average;
   determining a ratio of the weighted current error rate and the weighted average; and
   determining a CoAP segment size modification based upon the ratio.

8. The method of claim 7, wherein determining the CoAP segment size modification comprises querying a lookup table based upon the ratio to obtain a corresponding CoAP segment size.

9. The method of claim 7, wherein determining the CoAP segment size modification comprises decreasing the CoAP segment size when the ratio is positive and over a maximum ratio threshold.

10. The method of claim 9, comprising decreasing the CoAP segment size in increments of a maximum transmission unit size of a 6LoWPAN layer of the CoAP.

11. The method of claim 9, wherein determining the CoAP segment size modification comprises increasing the CoAP segment size when the ratio is negative and under a minimum ratio threshold.

12. The method of claim 11, comprising increasing the CoAP segment size in increments of a maximum transmission unit size of a 6LoWPAN layer of the CoAP.

13. A system, comprising:
    a utility meter configured to:
    measure consumption of at least one utility resource;
    communicate data relating to the energy consumption over a constrained application protocol (CoAP) configured to divide the data into CoAP segments of a CoAP segment size;
    determine error rate metrics of communications over the CoAP;
    determine a current error rate of the communications;
    determine a historical average of error rates of the communications;
    determine a CoAP segment size modification based upon the error rate metrics by:
    weighting the current error rate to obtain a weighted current error rate;
    weighting the historical average of error rates to obtain a weighted average;
    summing the weighted current error rate and the weighted historical average to obtain a manipulated variable; and
    correlating the manipulated variable with a corresponding CoAP segment size; and
    modify the CoAP segment size based upon the CoAP segment size modification.

14. The system of claim 13, comprising a lookup table configured to correlate a plurality of manipulated variables with a plurality of CoAP segment sizes.

15. An article of manufacture, comprising:
    one or more non-transitory, tangible, machine-readable media configured to store processor-executable instructions, the instructions comprising:
    instructions to:

determine error rate metrics of communications over a constrained application protocol (CoAP) using a CoAP segment size;
determine a current error rate of the communications; and
determine a historical average of error rates of the communications;

instructions to:
determine a CoAP segment size modification based upon the error rate metrics by:
weighting the current error rate to obtain a weighted current error rate;
weighting the historical average of error rates to obtain a weighted historical average;
summing the weighted current error rate and the weighted historical average to obtain a manipulated variable; and
correlating the manipulated variable with a corresponding CoAP segment size; and instructions to:
modify the CoAP segment size based upon the CoAP segment size modification.

16. The article of manufacture of claim 15, comprising instructions to determine the CoAP segment size modification based upon a current weighted error rate of the communications, a weighted average of error rates of the communications over a period of time, or both.

17. The article of manufacture of claim 15, comprising instructions to determine the CoAP segment size modification based upon a ratio of a current error rate of the communications to an average of error rates of the communications over a period of time.

\* \* \* \* \*